United States Patent Office 3,562,249
Patented Feb. 9, 1971

3,562,249
ARYLENE - BIS - [DI - (LOWER ALKOXYCARBONYL) - BENZENE - AZO - 2 - HYDROXY - 3 - CARBAMOYL-NAPHTHALENE] PIGMENTS
Ernfred Schnabel, Reinach, near Basel, and Emil Stocker, Riehen, near Basel, Switzerland, assignors to J. R. Geigy A.G., Basel, Switzerland
No Drawing. Filed Dec. 18, 1967, Ser. No. 691,228
Claims priority, application Switzerland, July 11, 1967, 9,888/67
Int. Cl. C08g 51/14; C09b 33/04; C09d 11/00
U.S. Cl. 260—184                              6 Claims

ABSTRACT OF THE DISCLOSURE

Pigments are disclosed herein which consist of, per molecule, two benzene-azo-2-hydroxy-3-carbamoyl-naphthalene dyestuff radicals in which each of the two benzene nuclei is substituted by two carboxylic acid ester groups, especially two lower alkoxy-carbonyl groups, one of which is in o-position to the azo bridge and the other is in p-position to the former ester group, and the carbamoyl groups of which moieties are linked by a bridge member bonded to the two nitrogen atoms of said carbamoyl groups; these novel pigments are distinguished by pure, vivid shades, great colour strength and very good fastness properties. The pigment in which the carboxylic acid ester groups are methoxycarbonyl groups and the bridging member is phenylene is distinguished by an unexpected carmine-red shade of great purity and strength of colour. These pigments are suitable for the pigmenting of polymeric organic material, particularly plastics such as polyvinylchloride and of printing inks for the graphic industry and in finely distributed form also for the pigmenting of curable resins and cellulose esters.

---

The present invention concerns new disazo pigments, processes for the production thereof, their use for the pigmenting of polymeric organic material as well as, as industrial product, the polymeric organic material pigmented therewith.

It has been found that new, valuable disazo pigments are obtained by coupling 2 equivalents of the diazonium compound of an amine of general Formula I

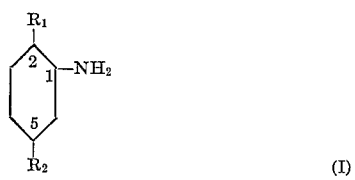

(I)

with 1 equivalent of a coupling component of general Formula II

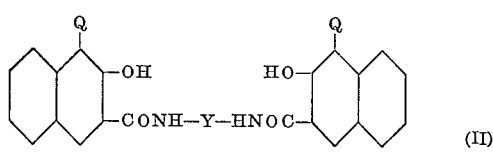

(II)

to form a disazo pigment of general Formula III

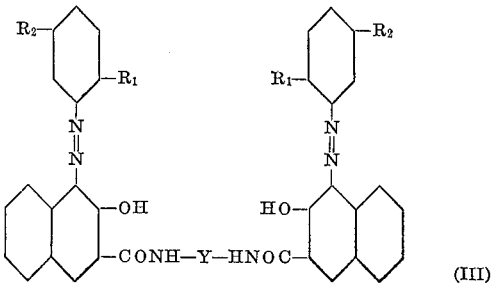

(III)

For this coupling, the starting materials of Formulae I and II are so chosen that the disazo pigment obtained of Formula III contains no water-solubilising groups, i.e. that the disazo pigment contains neither groups which dissociate acid in water such as sulphonic acid, carboxylic acid or phosphonic acid groups, nor onium groups such as ammonium of sulphonium groups, nor salt forming groups such as amino groups.

In the Formulae I, II and III:

$R_1$ represents a carboxylic acid ester group or an N,N-disubstituted carboxylic acid amide group, $R_2$ represents a carboxylic acid ester group, the carbamoyl or an N-mono- or N,N-disubstituted carboxylic acid amide group, Y represents the radical of a diamine, and Q represents hydrogen or a substituent which can be replaced by the azo group.

When $R_1$ and $R_2$ represent a carboxylic acid ester group then this is, e.g. an aryl, alkyl, cycloalkyl and aralkyl ester group. As carboxylic acid aryl ester groups, particularly monocyclic aryl ester groups are used, e.g. a carboxylic acid phenyl ester group the phenyl nucleus of which can also be substituted by alkyl groups such as methyl or ethyl, by alkoxy groups such as methoxy or ethoxy, or by halogen atoms such as bromine or chlorine. The amines of Formula I wherein $R_1$ and $R_2$ represent a carboxylic acid alkyl ester group, wherein alkyl preferably has at most 4 carbon atoms, particularly the carboxylic acid methyl ester group but also a carboxylic acid ethyl, n-propyl, isopropyl or tert. butyl ester group are of particular interest. As carboxylic acid cycloalkyl ester groups, particularly the carboxylic acid cyclohexyl group is mentioned or, as carboxylic acid aralkyl ester groups, the carboxylic acid benzyl or phenylethyl ester group are mentioned.

When $R_1$ and $R_2$ represent an N,N-disubstituted or $R_2$ represents an N-mono-substituted carboxylic acid amide group, then examples of nitrogen substituents are straight or branch chained alkyl radicals having, preferably, at most 4 carbon atoms, cycloalkyl radicals such as the cyclohexyl or methylcyclohexyl radical, aralkyl radicals particularly a phenalkyl radical such as the benzyl radical, or carbocyclic aryl radicals, then preferably the phenyl radical. The N,N-substituents of the carboxylic acid amido groups in $R_1$ and/or $R_2$, together with the nitrogen atom to which they are linked, can also form a 5- or 6-membered heterocyclic ring, such as the pyrrole, piperidine or morpholine ring. If these aryl and aralkyl radicals are further substituted in the aryl ring, they can contain as substituents, e.g. halogens such as fluorine, chlorine or bromine, cyano groups or alkoxy groups with at most 2 carbon atoms.

The benzene ring of the amines of Formula I can also contain further substituents, e.g. halogens such as chlorine, but also bromine or fluorine, or alkyl or alkoxy groups with at most 3 carbon atoms such as the methyl or ethyl group, or the methoxy or ethoxy group; and also the cyano group. Preferably however, the benzene ring is not further substituted.

In this connection, the following compounds of Formula I can be mentioned as examples: 1-aminobenzene-2,5-dicarboxylic acid phenyl ester, 1-aminobenzene-2,5-dicarboxylic acid-2'-, -3'-, or -4'-chloro-, -2'-, -3'-, or -4'-bromo-, -2'- or -4'-methyl-, -4'-ethyl-, -2'-, -3'- or -4'-methoxy- or -2'-, -3'- or -4'-ethoxy phenyl ester, 1-aminobenzene-2,5-dicarboxylic acid methyl, ethyl, n-propyl, isopropyl, or tert.butyl ester, 1-aminobenzene-2,5-dicarboxylic acid cyclohexyl ester, and 1-aminobenzene-2,5-dicarboxylic acid benzyl or phenethyl ester, 1-amino-4-bromo-, -4-methyl-, -4-methoxy-benzene-2,5-dicarboxylic acid methyl ester, 1-amino-4-bromo- or -4-cyano-benzene-2-carboxylic acid methyl ester-5-carboxylic acid amide.

As examples are mentioned:

1-aminobenzene-2,5-dicarboxylic acid-N,N-dimethylamide,
1-aminobenezene-2,5-dicarboxylic acid-N,N-di-iso- or n-propylamide,
1-aminobenzene-2,5-dicarboxylic acid piperidide,
1-aminobenzene-2-carboxylic acid diethylamide,
-2-carboxylic acid-N,N-dimethylamide,
-2-carboxylic acid-N-methyl-N-cyclohexylamide,
-2-carboxylic acid-N,N-dicyclohexylamide,
-2-carboxylic acid-N-methyl-N-phenylamide-5-carboxylic acid methyl ester,
1-aminobenzene-2-carboxylic acid methyl ester-5-carboxylic acid-N-phenylamide,
-5-carboxylic acid-N-4'-methoxyphenylamide,
-5-carboxylic acid-N-methylamide,
-5-carboxylic acid-N-methyl-N-cyclohexylamide,
-5-carboxylic acid-N-methyl-N-phenylamide,
-5-carboxylic acid-N-benzylamide,
-5-carboxylic acid-N-3'-chloro-benzylamide, or
-5-carboxylic acid amide, and
1-aminobenzene-2-carboxylic acid-N,N-dimethylamide-5-carboxylic acid phenylamide,
1-aminobenzene-2-carboxylic acid-N,N-diethylamide-5-carboxylic acid-N-phenylamide,
1-aminobenzene-2-carboxylic-acid morpholide-5-carboxylic acid methyl ester.

As radical of a diamine, Y belongs to the aliphatic series or to the series of aromatic carbocycles which can be mono- or polynuclear or condensed with other carbocycles or with heterocycles.

As aliphatic radical Y is, e.g. an alkylene group having up to 8 carbon atoms and, preferably having 2 to 6 carbon atoms such as the dimethylene, pentamethylene or hexamethylene radical, or it is a cycloalkylene group such as the 1,4-cyclohexylene radical.

Principally however, Y represents a mono- or di-cyclic arylene radical, particularly the phenylene radical or also a naphthylene radical; also it represents the double-bonding radical of fluoroanthene, pyrene and chrysene, or the polynuclear aromatic radical

wherein Z is the direct carbon bond, or it represents the groups NH—CO—NH, S, O, NH, CH$_2$, CO, SO$_2$, SO$_2$NH, N=N, COO, CONH.

Finally Y can also represent a heterocyclic radical such as a pyridine radical or also a tricyclic heterocyclic radical, e.g. the dibenzofuran or carbazole radical.

All mono- or dicyclic arylene or polynuclear aromatic or heterocyclic radicals mentioned under Y can be further substituted by substituents, e.g. by halogens such as chlorine or bromine, alkyl or alkoxy groups with at most 3 carbon atoms such as the methyl, ethyl or isopropyl group, or the methoxy or ethoxy group. Advantageously Y represents the non-further substituted p-phenylene radical or a p-phenylene radical substituted by lower alkyl or chloro groups.

When Q in coupling components of Formula II represents a substituent which can be replaced by the diazo group, then it is principally the —CH$_2$X— group wherein X is the radical of an amine, preferably the

radical wherein X$_1$ is hydrogen or an alkyl group and X$_2$ is an alkyl group, or X$_1$ and X$_2$ together with the nitrogen atom form a heterocyclic 5- or 6-membered ring. The alkyl groups mentioned for X$_1$ and X$_2$ advantageously have at most 2 carbon atoms. Advantageously Q represents hydrogen.

The naphthalene nucleus of the coupling component of Formula II can be further substituted, advantageously in 6-position, by e.g. halogen atoms such as chlorine, bromine or fluorine; alkyl groups such as the methyl or ethyl group or alkoxy groups such as the methoxy or ethoxy group.

The amines of Formula I usable as diazo components can be produced by known methods. For example, the 1-aminobenzene-2,5-dicarboxylic acid esters are obtained by nitration of the corresponding terephthalic acid diesters and reduction of the nitro compounds obtained to the amino compounds.

The 1-aminobenzene-2-carboxylic acid ester 5-carboxylic acid amides can be obtained, e.g. analogously to the method described in German specification laid open to public inspection No. 1,199,905 by partial saponification of the 1-nitrobenzene-2,5-dicarboxylic acid diesters to the 1-nitrobenzene-2-carboxylic acid ester-5-carboxylic acids and conversion of the latter into the corresponding 1-nitrobenzene-2-carboxylic acid ester-5-carboxylic acid chlorides, reaction with an amine to form such carboxylic acid ester-5-carboxylic acid amides and then reduction of the nitro compounds to form the 1-aminobenzene-2-carboxylic acid ester-5-carboxylic acid amides. The 1-aminobenzene-2-carboxylic acid amide-5-carboxylic acid esters or amides are obtained by partially saponifying 1-nitrobenzene-2,5-dicarboxylic acid diamides with an equivalent of potassium hydroxide to form the 1-nitrobenzene-2-carboxylic acid amide-5-carboxylic acids, converting these, e.g. with thionyl chloride or phosphorus pentachloride in an inert solvent, optionally in the presence of pyridine, into the corresponding 1-nitrobenzene-2-carboxylic acid amide-5-carboxylic acid chlorides and then reacting such chlorides with a suitable hydroxyl compound to form the 1-nitrobenzene-2-carboxylic acid amide-5-carboxylic acid esters or reacting the chlorides with a primary and secondary amine desired to form the 1-nitrobenzene-2-carboxylic acid amide-5-carboxylic acid amides and then reducing these esters or amides catalytically to form the corresponding 1-aminobenzene-2-carboxylic acid amide-5-carboxylic acid esters or amides.

The coupling components of Formula II are obtained advantageously by condensing two equivalents of 2-hydroxynaphthalene-3-carboxylic acid, which can optionally be further substituted, with one equivalent of a diamino compound of Formula IV $$H_2N—Y—NH_2 \qquad (IV)$$

wherein Y has the meaning given in Formula II, the condensation being performed in the presence of a condensing agent such as phosphorus trichloride, in an inert organic solvent such as toluene, xylene, benzene, monochlorobenzene or o-dichlorobenzene, or by converting the optionally substituted 2-hydroxynaphthalene-3-carboxylic acid with an acid halogenating agent, preferably an acid chlorinating agent such as thionyl chloride, into the corresponding carboxylic acid halide and condensing this with one equivalent of a diamine of Formula IV, this latter condensation advantageously being performed at a raised temperature of from 100–130° C. in a suitable organic solvent such as chlorobenzene or dioxane, optionally in the presence of an acid binding agent such as sodium acetate or pyridine.

Coupling components of general Formula II wherein Q is, e.g. the —CH₂X— group are obtained, e.g. by condensation in the usual way of a coupling component of Formula II wherein Q is hydrogen or, advantageously, condensation of 2-hydroxynaphthalene-3-carboxylic acid with formaldehyde and a primary or secondary amine and then reaction of the latter condensation product as described in the previous paragraph. In the coupling, the —CH₂X— radical is replaced by the azo group. Such a coupling is advantageously performed in acid medium.

Examples of coupling components of Formula II are: ω,ω'-bis - (2' - hydroxy - (3')-naphthoylamido)-ethane, -pentane, -hexane; ω,ω'-bis-(1'-dimethylaminomethyl-, 1'-piperidinomethyl-, or 1'-morpholinomethyl - 2'-hydroxy-(3')-naphthoylamido) - pentane; 1,4-bis - (2' - hydroxy-(3') - naphthoylamido) - cyclohexane, 1,4-bis - (2' - hydroxy - (3') - naphthoylamido) - benzene, -2-chlorobenzene, -2-bromobenzene, -2-methylbenzene, -2-methoxybenzene, -2,5 - dimethylbenzene, -2,5 - dimethoxybenzene, -2,5-diethoxybenzene, -2,5-dichlorobenzene; 1,5-bis-(2'-hydroxy-(3') - naphthoylamido) - naphthalene; 2,8-bis-(2'-hydroxy-(3') - naphthoylamido) - chrysene; 4,4'-bis-(2''-hydroxy - (3'') - naphthoylamido) - diphenyl, -3,3'-dichlorodiphenyl, -3,3'-dimethoxydiphenyl; 4,4'-bis-(2''-hydroxy - (3'') - naphthoylamido) - diphenyl urea, -diphenyl ether, -diphenyl sulphide, -diphenylamine, -diphenylmethane, -diphenyl ketone, -diphenyl sulphone, -diphenyl sulphamide, -azobenzene, -benzoic acid phenyl ester, -benzoic acid phenyl amide; 3,3'-bis-(2''-hydroxy-(3'')-naphthoylamido)-diphenylsulphone; 2,7-bis-(2'-hydroxy-(3') - naphthoylamido) - dibenzofuran and -carbazole; 2,6-bis-(2'-hydroxy-(3')-naphthoylamido)-pyridine.

The diazonium compound of an amine of Formula I is coupled with the coupling component of Formula II by the usual methods, advantageously in weakly acetic acid medium at a temperature of 0 to about 40° C. by adding dropwise an aqueous-alkaline solution of the coupling component in the presence of usual auxiliaries which favour the azo coupling, to the aqueous solution of the diazonium compound. A comminuter is used to ensure that the average particle size of the coupling component, which is difficultly soluble in the acid coupling mixture, and of the dyestuff formed is kept under 5μ.

This comminution is advantageously effected by trituration, particularly by mechanical grinding of the dispersion with solid bodies. In practice, the apparatus used to perform the process to attain the necessary grinding is, chiefly, ball or sand mills, anchor stirrers, high speed stirrers which advantageously are fitted with rotors and stators, also however, hopper mills fitted with a grinding disc, high pressure mills or supersonic apparatus.

Chiefly chemically inert, anion active, non-ionogenic or cation active dispersing agents are used as auxiliaries which favour the azo coupling as well as, optionally, have a favourable effect on the particle size and crystal form of the disazo pigment to be formed. As such, alkylaryl sulphonates such as dodecylbenzene sulphonate or 1,1' - dinaphthylmethane-2,2'-disulphonic acid, polyalkyleneoxy addition products of more than one equivalent of alkylene oxide, particularly ethylene oxide, and, e.g. higher fatty alcohols or fatty acids, or also lauryl dimethylbenzyl ammonium chloride, are particularly suitable. In addition, also resins or resin soaps, e.g. based on colophonium, protective colloids such as casein or methyl cellulose, oils or plasticisers can be used, also water-miscible inert organic solvents such as acetic acid, ethanol, ethylene glycol monomethyl ether, acetone, dimethyl formamide, triethanolamine or pyridine, or then relatively small amounts of non-water-miscible organic solvents such as toluene, chlorobenzene, nitrobenzene, carbon tetrachloride or trichloroethylene.

Finally also solid colourless substrates such as barium sulphate or hydrate of alumina can be used as auxiliaries.

The new disazo pigments precipitate from the reaction mixture immediately after the coupling. They are isolated in the usual way by filtration and washing and, if desired, purified.

A modification of the process according to the invention consists in condensing two equivalents of a monoazo dyestuff carboxylic acid halide of the general Formula V

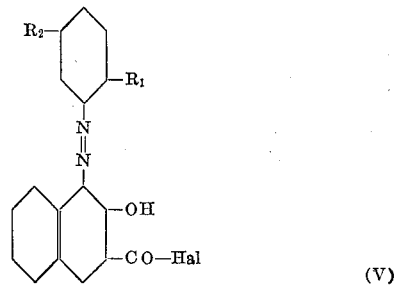

in which formula R₁ and R₂ have the meanings given in Formula I, and Hal represents bromine or, particularly, chlorine, with one equivalent of a diamino compound of Formula IV to form a disazo pigment of Formula III.

The monoazo dyestuff carboxylic acid halides usable as starting materials of Formula V are obtained, e.g. by treating the corresponding monoazo dyestuff carboxylic acids—which are obtained by coupling the diazonium compound of amines of Formula I with 2-hydroxynaphthalene-3-carboxylic acids and drying—with acid halogenating agents. By acid halogenating agents are meant those which are capable of converting carboxylic acids into their halides, e.g. the bromides or chlorides; thus in particular are meant phosphorus halides such as phosphorus pentabromide, phosphorus trichloride or pentachloride, phosphorus oxyhalides such as phosphorus oxychloride, preferably however, thionyl chloride. The treatment with such acid halogenating agents is performed advantageously in inert organic solvents such as in optionally halogenated or nitrated hydrocarbons, e.g. benzene, toluene, xylenes, mono- or di-chlorobenzenes, nitrobenzene or, optionally, in the presence of catalytic amounts of dimethyl formamide. To produce particularly pure disazo pigments, it can be of advantage to first precipitate the carboxylic acid chlorides obtained of Formula V and, optionally, to recrystallise them. In some cases it is also possible to dispense with the isolation of the carboxylic acid halides and to perform the condensation with the diamino compound of Formula IV immediately afterwards in one step.

Advantageously, the condensation of the monoazo dyestuff carboxylic acid halides of Formula V with the diamines of Formula IV is performed using an excess of the former and, advantageously, in an anhydrous organic solvent. Under these conditions, the condensation is generally performed surprisingly easily and even at temperatures which are within the boiling range of usual organic solvents such as dimethyl formamide, toluene, mono- or di-chlorobenzene, nitrobenzene and similar solvents. To accelerate the condensation, in general it is recommended to remove the hydrohalic acid formed during the reaction. This can be done, e.g. by continuous distillation, boiling under reflux or addition of an acid binding agent such as anhydrous sodium acetate, pyridine or anhydrous urea.

The new disazo pigments of Formula III are isolated in the usual way, particularly by filtration.

In most cases, the new disazo pigments are obtained in very good yield and in a pure state. For certain purposes, the crude pigment can be used directly; its properties however, particularly with regard to purity and form, can be further improved by known methods, e.g. by crystallisation or extraction with organic solvents or by milling with milling auxiliaries which can later be removed, e.g. salts.

The new disazo pigments obtained according to the invention have very good fastness properties, particularly good fastness to migration, heat, cross-lacquering, light and weathering and, in addition, they are distinguished by pure shades and great colour strength. They are suitable for the pigmenting of polymeric organic material, particularly for the pigmenting of plastics such as polyethylene, polystyrene, polyvinylchloride, particularly hard polyvinyl chloride and, in general, they are distinguished by particularly good fastness to light and migration. They can also be used for other purposes, e.g. in finely distributed form, for the pigmenting of curable resins, cellulose esters, particularly for the colouring of viscose or acetate silk spinning masses, as well as for pigment printing and pad dyeing of textiles. In addition they are also suitable for the pigmenting of printing inks for the graphic industry, chiefly for paper printing but also for the colouring of paper pulp and, quite generally, for the coating of paper. Examples of purposes for which they can be used are: printing of packing materials or advertisements, printing or coating of wall papers and multi-colour paper, or for the production of paper laminates. The pigments can also be used, however, in paints having an oily basis such as linseed oil colours, or paints having an aqueous base such as dispersion colours, in lacquers of various types such as in nitro, stoving or alkyd resin lacquers.

The new disazo pigments colour these materials in very strongly coloured, light-fast, brown, blueish red, carmine red to red shades. The great colour strength enables easily flowing, strongly coloured printing inks to be attained and, therefore, relatively thin films of print, which is of particular importance in the graphic industry, when used in printing inks, also the beautiful brilliance and transparency of the prints obtained with the new pigments should be mentioned. Transparency is also very desirable in the colouring of artificial spinning masses. Moreover, the fastness of the new disazo pigments to oils and solvents is very good.

Compared with the nearest comparable pigments, the new disazo pigments have the advantage of better fastness to light and migration.

Particularly valuable disazo pigments according to the invention are those of Formula III, in which $R_1$ and $R_2$ are identical and represent a carboxylic acid-low alkyl ester group, wherein alkyl preferably has at most 4 carbon atoms, particularly the carboxylic acid methyl but also ethyl or propyl ester group, and Y represents the unsubstituted p-phenylene radical or the p-phenylene radical substituted by methyl or chloro groups such as the 2-methyl-, 2,5-dimethyl- or 2-chloro-p-phenylene radical, or the 4,4-diphenylene radical, because very strongly coloured orange, carmine, red or brown pigmented plastics which are very light-fast, and also lacquers or paints and printing inks can be produced therewith.

The following non-limitative examples illustrate the invention. The temperatures are given therein in degrees centigrade.

EXAMPLE 1

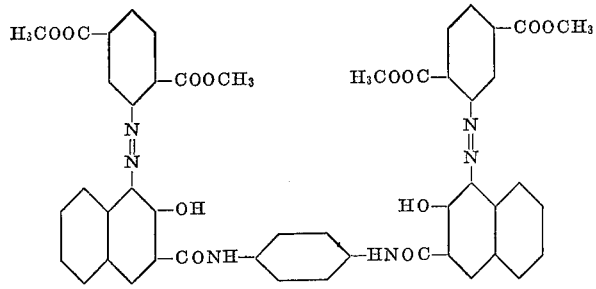

11.5 g. of 1-aminoterephthalic acid dimethyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature. 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xylene are added to the solution and then a solution of 11.2 g. of 1,4-bis(2'-hydroxy-(3')-naphthoylamido)-benzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 21.5 g. of a crude pigment of the above formula are obtained. The pigment is particularly valuable because of its pure, vivid carmine-red shade. It is very well suited for the pigmenting of polyvinyl chloride containing plasticiser in carmine-red shades which are fast to migration.

15.0 g. of this crude pigment are added to 145 ml. of dry dimethyl aniline, the mixture is stirred for 6–7 hours at a temperature of 180–190°, the finely crystalline pigment formed is filtered off at a temperature of 110–120° and the filter residue is washed with 100° hot dimethyl aniline until the washing liquor is colourless. The dimethyl aniline is then removed from the filter cake by washing with methanol and the soft grain pigment is dried at about 100°. The strongly coloured, carmine-red pigmentings of polyvinyl chloride containing plasticiser attained with this conditioned pigment have even better properties than those attained with the crude pigment, in particular very good fastness to heat, migration and light. Stoving lacquers pigmented in pure carmine-red shades with this conditioned pigment have very good fastness to cross-lacquering and weathering.

EXAMPLE 2

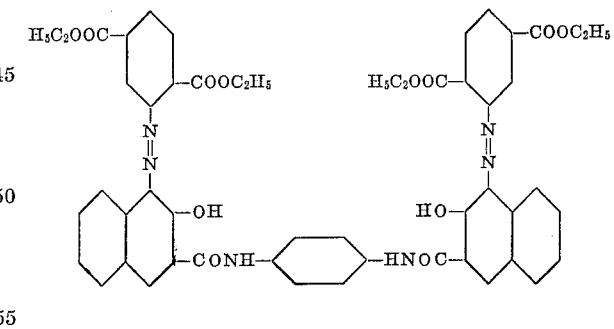

13.2 g. of 1-aminoterephthalic acid diethyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature. 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xylene are added to the solution and then a solution of 11.2 g. of 1,4-bis-(2'-hydroxy-(3')-naphthoylamido)-benzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 16.5 g. of a crude pigment of the above formula are obtained. It is very well suited for the pigmenting of polyvinyl chloride containing plasticiser in orange-red shades which are fast to migration.

This crude pigment is conditioned in the same manner as described in Example 1. The strongly coloured orange-red pigmentings of polyvinyl chloride containing plasticiser attained with this conditioned pigment have even better properties than those attained with the crude pigment, in particular very good fastness to heat, migration and light. Stoving lacquers pigmented in pure orange-red shades with this conditioned pigment have very good fastness to cross-lacquering and weathering.

EXAMPLE 3

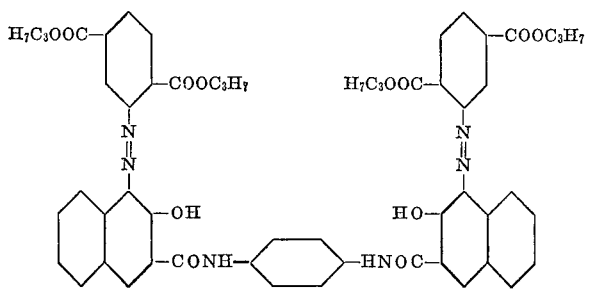

14.6 g. of 1-aminoterephthalic acid di-n-propyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature, 350 ml. of ice water are added and the whole is diazotised at 0–5° by quickly pouring in 55 ml. of 1 N sodium nitrite solution. As soon as a clear solution has been attained, the excess nitrous acid is decomposed by the addition of solid sulphamic acid, 23 ml. of 2 N sodium acetate solution and 10 ml. of xylene are added to the solution and then a solution of 11.2 g. of 1,4-bis-(2'-hydroxy-(3')-naphthoylamido)-benzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 20.0 g. of a crude pigment of the above formula are obtained. It is very well suited for the pigmenting of polyvinyl chloride containing plasticiser in red-brown shades which are fast to migration.

This crude pigment is conditioned in the same manner as described in Example 1. The strongly coloured, red-brown pigmentings of polyvinyl chloride containing plasticiser attained with this conditioned pigment have been better properties than those attained with the crude pigment, in particular very good fastness to heat, migration and light. Stoving lacquers pigmented in pure red-brown shades with this conditioned pigment have very good fastness to cross-lacquering and weathering.

EXAMPLE 4

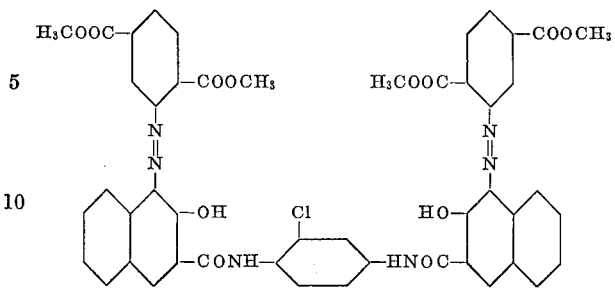

11.5 g. of 1-aminoterephthalic acid dimethyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature, 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xylene are added to the solution and then a solution of 12.1 g. of 1,4-bis-(2'-hydroxy-(3')-naphthoylamido)-2-chlorobenzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 17.9 g. of a crude pigment of the above formula are obtained. It is very well suited for the pigmenting of polyvinyl chloride containing plasticiser in brown shades which are fast to migration.

This crude pigment is conditioned in the same manner as described in Example 1. The strongly coloured brown pigmentings of polyvinyl chloride containing plasticiser attained with this conditioned pigment have even better properties than those attained with the crude pigment, in particular very good fastness to heat, migration and light. Stoving lacquers pigmented in pure brown shades with this conditioned pigment have very good fastness to cross-lacquering and weathering.

EXAMPLE 5

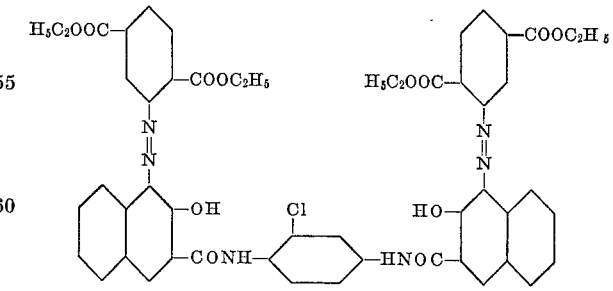

13.2 g. of 1-aminoterephthalic acid diethyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature, 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xylene are added to the solution and then a solution of 12.1 g. of 1,4-bis-(2'-hydroxy-(3')-naphthoylamido)-2-chlorobenzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component the high speed stirrer is removed and the reaction mixture is stirred with an anchor stirrer at room temperature until the coupling is complete. This disazo pigment formed is then filtered off, thoroughly washed with water, dried at 100° and pulverised.

In this way, 19.9 g. of a crude pigment of the above formula are obtained. It is very well suited for the pigmenting of polyvinyl chloride containing plasticiser in red-brown shades which are fast to migration.

This crude pigment is conditioned in the same manner as described in Example 1. The strongly coloured, red-brown pigmentings of polyvinyl chloride containing plasticiser attained with this conditioned pigment have even better properties than those attained with the crude pigment, in particular very good fastness to heat, migration and light. Stoving lacquers pigmented in pure red-brown shades with this conditioned pigment have very good fastness to cross-lacquering and weathering.

EXAMPLE 6

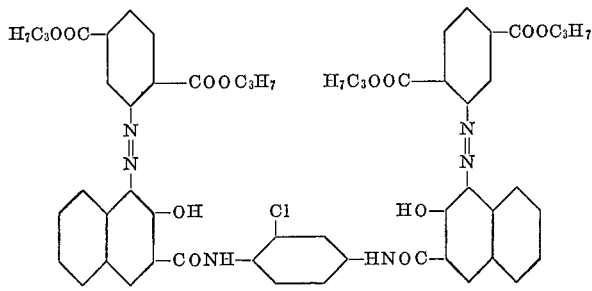

14.6 g. of 1-aminoterephthalic acid di-n-propyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature, 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xylene are added to the solution and then a solution of 12.1 g. of 1,4-bis-(2'-hydroxy-(3')-naphthoylamido) - 2 - chlorobenzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 19.5 g. of a crude pigment of the above formula are obtained. It is very well suited for the pigmenting of polyvinyl chloride containing plasticiser in red-brown shades which are fast to migration.

This crude pigment is conditioned in the same manner as described in Example 1. The strongly coloured, red-brown pigmentings of polyvinyl chloride containing plasticiser attained with this conditioned pigment have even better properties than those attained with the crude pigment, in particular very good fastness to heat, migration and light. Stoving lacquers pigmented in pure red-brown shades with this conditioned pigment have very good fastness to cross-lacquering and weathering.

EXAMPLE 7

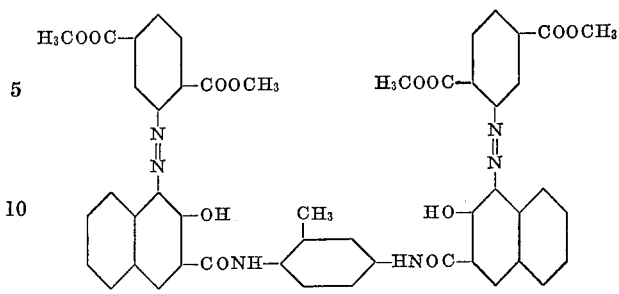

11.5 g. of 1 - aminoterephthalic acid dimethyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature, 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xylene are added to the solution and then a solution of 11.8 g. of 1,4 - bis - (2' - hydroxy-(3')-naphthoylamido)-2-methylbenzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 18.0 g. of a crude pigment of the above formula are obtained. It is very well suited for the pigmenting of polyvinyl chloride containing plasticiser in red shades which are fast to migration.

This crude pigment is conditioned in the same manner as described in Example 1. The strongly coloured blueish red pigmentings of polyvinyl chloride containing plasticiser attained with this conditioned pigment have even better properties than those attained with the crude pigment, in particular very good fastness to heat, migration and light. Stoving lacquers pigmented in pure blueish red shades with this conditioned pigment have very good fastness to cross-lacquering and weathering.

EXAMPLE 8

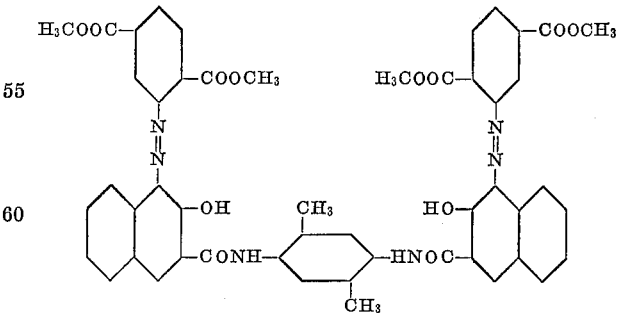

11.5 g. of 1-aminoterephthalic acid dimethyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature, 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xy-

13 lene are added to the solution and then a solution of 11.5 g. of 1,4 - bis - (2' - hydroxy-(3')-naphthoylamido)2,5-dimethylbenzene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 18.7 g. of a crude pigment of the above formula are obtained. It is very well suited for the pigmenting of polyvinyl chloride containing plasticiser in brown shades which are fast to migration.

This crude pigment is conditioned in the same manner as described in Example 1. The strongly coloured, brown pigmentings of polyvinyl chloride containing plasticiser attained with this conditioned pigment have even better properties than those attained with the crude pigment, in particular very good fastness to heat, migration and light. Stoving lacquers pigmented in pure brown shades with this conditioned pigment have very good fastness to cross-lacquering and weathering.

14 of 2 N sodium acetate solution and 10 ml. of xylene are added to the solution and then a solution of 13.1 g. of 4,4' - bis - (2''-hydroxy-(3'')-naphthoylamido)-diphenylene in 38 ml. of 2 N sodium hydroxide solution, 20 ml. of ethanol and 190 ml. of water is added dropwise, within 10 minutes while stirring with a high speed stirrer, to the previously prepared diazonium salt solution. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 9.2 g. of a crude pigment of the above formula are obtained. It is very well suited for the pigmenting of polyvinyl chloride containing plasticiser in blueish red shades which are fast to migration.

This crude pigment is conditioned in the same manner as described in Example 1. The strongly coloured, blueish red pigmenting of polyvinyl chloride containing plasticiser attained with this conditioned pigment have even better properties than those attained with the crude pigment, in particular very good fastness to heat, migration and light. Stoving lacquers pigmented in pure blueish red shades with this conditioned pigment have very good fastness to cross-lacquering and weathering.

By repeating the above example but replacing the 11.5

EXAMPLE 9

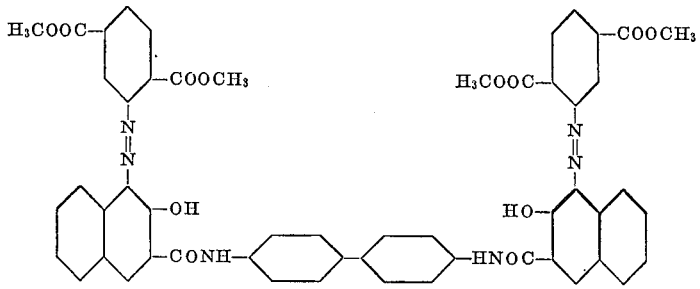

11.5 g. of 1-aminoterephthalic acid dimethyl ester are added to 150 ml. of water containing 15 ml. of 10 N hydrochloric acid and 20 g. of a 5% aqueous solution of the addition product of 18 to 20 mols of ethylene oxide and stearyl alcohol. The mixture is then stirred for 2 hours at room temperature, 350 ml. of ice water are added and the whole is diazotised at 0–5° by quickly pouring in 55 ml. of a 1 N sodium nitrite solution. As soon as a clear solution has been attained, the excess nitrous acid is decomposed by the addition of solid sulphamic acid, 23 ml.

g. of 1-aminoterephthalic acid dimethyl ester by equimolar amounts of one of the diazo components given in column II of the following Table I and reacting the latter under the conditions described in the above example with equivalent amounts of one of the coupling components given in column III, there are obtained disazo pigments which have similarly valuable properties. The shades produced in polyvinyl chloride films by incorporating the respective pigments therein are given in the last column of the table.

TABLE I

| I | II | | III | | IV |
|---|---|---|---|---|---|
| | Diazo component | | Coupling component | | |
| No. | $R_2$ | $R_1$ | Y | Z | Shade of pigmented polyvinyl chloride film |
| 10 | —COOCH$_2$—⌬ | —COOCH$_2$—⌬ | pyridyl | H | Red. |
| 11 | —CONH—⌬ | —COOCH$_3$ | —⌬— | H | Orange. |
| 12 | —COOCH$_3$ | —COOCH$_3$ | —(CH$_2$)$_2$— | H | Do. |
| 13 | —COOCH$_3$ | —COOCH$_3$ | —⌬—C(O)—⌬— | H | Do. |

TABLE I—Continued

| No. | Diazo component R₂ | R₁ | Coupling component Y | Z | Shade of pigmented polyvinyl chloride film |
|---|---|---|---|---|---|
| 14 | —COOCH₃ | —COOCH₃ | dibenzofuran-diyl | H | Orange. |
| 15 | —COOC₄H₉ | —COOC₄H₉ | phenylene | H | Brown-red. |
| 16 | —COO—C₆H₁₁ (cyclohexyl) | —COO—C₆H₁₁ | —(CH₂)₆— | H | Yellowish-orange. |
| 17 | —COO—phenyl | —COO—phenyl | methyl-phenylene | Br | Brownish-red. |
| 18 | —COOCH₃ | —CON(CH₃)₂ | biphenylene | H | Red. |
| 19 | —COOCH₃ | —CON(H)(CH₃)(phenyl) | 3,3′-dichlorobiphenylene | Cl | Yellowish-red. |
| 20 | —COOCH₃ | —CON(H)(H)(phenyl) | dimethyl-naphthylene | H | Blue-red. |
| 21 | —COOCH₃ | —CON(CH₃)(phenyl) | steroid/fused polycyclic | H | Brown-red. |
| 22 | —CONH₂ | —COOCH₃ | 2,5-dimethyl-phenylene | H | Brown. |
| 23 | —CONHCH₃ | —COOCH₃ | phenyl-COO-phenyl | H | Red. |
| 24 | —CON(CH₃)(phenyl) | —COOCH₃ | phenyl-N=N-phenyl | OCH₃ | Yellowish-red. |
| 25 | —CON(CH₃)(phenyl) | —COOCH₃ | carbazole-diyl | H | Brownish-red. |
| 26 | —COO—C₆H₄—Cl | —COO—C₆H₄—Cl | 3,3′-dimethoxybiphenylene | H | Red. |
| 27 | —COOCH₃ | —COOCH₃ | methoxy-phenylene | H | Blueish red. |

TABLE I—Continued

| No. | R₂ | R₁ | Y | Z | Shade of pigmented polyvinyl chloride film |
|---|---|---|---|---|---|
| 28 | —COO—⟨⟩—OCH₃ | —COO—⟨⟩—OCH₃ | —⟨⟩—NHCONH—⟨⟩— | H | Red. |
| 29 | —COO—⟨⟩—CH₃ | —COO—⟨⟩—CH₃ | —⟨⟩—O—⟨⟩— | H | Red. |
| 30 | —CONH—⟨⟩ | —CONH—⟨⟩ | —⟨⟩—NH—⟨⟩— | H | Red. |
| 31 | —COOCH₃ | —COOCH₃ | —⟨⟩—CH₂—⟨⟩— | H | Red. |
| 32 | do | do | —⟨⟩— (2,5-diCH₃) | Br | Red-brown. |
| 33 | do | do | —⟨⟩— (2,5-diCl) | H | Do. |
| 34 | do | do | —⟨⟩—SO₂—⟨⟩— | H | Red. |
| 35 | do | do | —⟨⟩—SO₂NH—⟨⟩— | H | Red. |
| 36 | —CONH—CH₂—⟨⟩—Cl | do | —⟨⟩— | H | Red. |
| 37 | —CONH—⟨⟩—OCH₃ | do | Same as above | H | Red. |
| 38 | —CON(C₃H₇)₂ | —CON(C₃H₇)₂ | —⟨⟩— (OC₂H₅, OC₂H₅) | H | Red. |
| 39 | —COOCH₃ | —COOCH₃ | —⟨⟩—⟨⟩— (CH₃O, OCH₃) | H | Red. |
| 40 | do | do | —⟨⟩—Br | H | Red-brown. |
| 41 | —CONH—⟨⟩ | —CON(CH₃)₂ | —(CH₂)₅— | H | Red. |
| 42 | —CON(C₃H₇)₂ | —CON(C₃H₇)₂ | —⟨naphthyl⟩— | H | Red. |
| 43 | —CONHCH₂—⟨⟩ | —COOCH₃ | —⟨⟩—H | H | Red. |

EXAMPLE 44

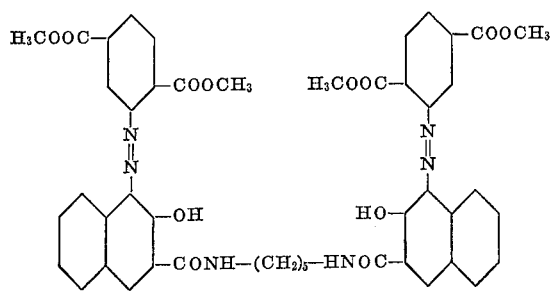

11.5 g. of 1-aminoterephthalic acid dimethyl ester are added to 150 ml. of water containing 15 ml. of 10 N hydrochloric acid and 20 g. of a 5% aqueous solution of the addition product of 18 to 20 mols of ethylene oxide and stearyl alcohol, the mixture being stirred for 2 hours at room temperature. 350 ml. of ice water are added and diazotisation is performed at 0–5° by quickly pouring in 55 ml. of 1 N sodium nitrite solution. As soon as a clear solution has been formed, the excess nitrous acid is decomposed by the addition of solid sulphamic acid, 23 ml. of 2 N sodium acetate solution and 10 ml. of xylene are then added to the solution and then a solution of 13.6 g. of 1,5 - bis - (1' - dimethyl - aminomethyl-2'-hydroxy-3'-naphthoyl-amido)-pentane in 38 ml. of 2 N sodium hydroxide solution, 20 ml. of ethanol and 190 ml. of water is added dropwise within 10 minutes to the previously prepared diazonium salt solution while stirring vigorously with a high speed stirrer.

The pigment suspension formed is then stirred until the coupling has been completed with a normal stirrer, the disazo pigment formed is filtered off, washed with water and dried at a temperature not exceeding 100°. 24.6 g. of a crude red pigment are obtained.

15.0 g. of this crude pigment are stirred with 145 g. of dry dimethyl aniline, it is well stirred for 6–7 hours at 180 to 190° and then filtered off at about 120°. The finely crystalline pigment is then well washed with dimethyl aniline until the washing liquor is colourless for all practical purposes and then it is well washed with methanol and dried at a temperature not exceeding 100°.

When mixed on rollers with polyvinyl chloride containing plasticiser, the finely crystalline and soft grain pigment obtained produces red pigmentings which have very good fastness to migration, heat and light.

The 1,5 - bis-(1'-dimethylaminomethyl-2'-hydroxy-3'-naphthoyl-amido)-pentane used as coupling component can be produced by known processes by reacting 1,5-bis-(2'-hydroxy-3'-naphthoyl-amido)-pentane with formaldehyde and dimethyl aniline.

Disazo pigments having similar properties are obtained if equivalent amounts of corresponding coupling components which contain a diethylaminomethyl group, a piperidinomethyl or a morpholinomethyl group in the 1'-position instead of the dimethylaminomethyl group, are used as starting materials.

EXAMPLE 45

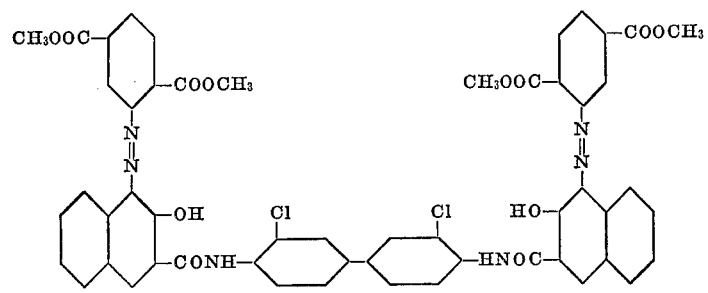

51.0 g. of the coupling product of diazotised 1-aminoterephthalic acid dimethyl ester and 2-hydroxy-3-naphthoic acid are suspended in 750 ml. of dry chlorobenzene. 100 ml. of chlorobenzene are distilled off in order to attain complete dehydration and, at 70°, 18.8 g. of thionyl chloride, which has been distilled over linseed oil, are added within 5 minutes to the suspension. The reaction mixture is kept boiling for 5 hours, the precipitated monoazo dyestuff carboxylic acid chloride is filtered off at boiling temperature, washed with a small quantity of dry chlorobenzene and dried in vacuo at 70°. The carboxylic acid chloride mentioned is obtained in the form of pale reddish crystals.

17.4 g. of this monoazo dyestuff carboxylic acid chloride are suspended in 500 ml. of dry toluene. 4.7 g. of dry chlorobenzene and dried in vacuo at 70°. The carsuspension at boiling temperature (108°) and then rinsed with 80 ml. of dry toluene. The condensation forming the disazo pigment starts immediately. The reaction mixture is kept at the boil for 20 to 24 hours until no more hydrogen chloride is developed whereupon the pigment formed which has crystallised out is filtered off from the hot suspension, washed with warm toluene until the washing liquor is colourless and the filter cake is dried at 70° in vacuo.

A red pigment powder is obtained.

If in the above example, the 1-aminoterephthalic acid dimethyl ester is replaced by corresponding amounts of 1-amino-4-bromo-, -4-methyl- or -4-methoxy- terephthalic acid dimethyl ester and otherwise the procedure given in the example is followed, then disazo pigments having similar properties are obtained.

The disazo pigments produced according to Examples 1 to 44, can also be produced by the process of Example 45 with the use of corresponding starting materials.

EXAMPLE 46

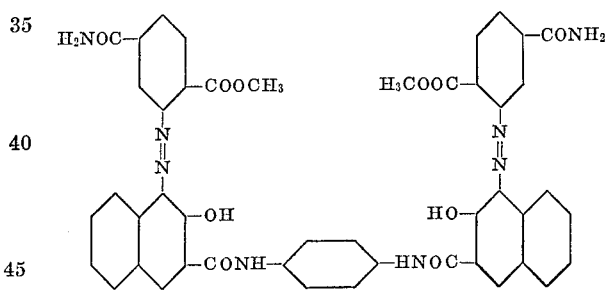

10.7 g. of 1-aminobenzene-2-carboxylic acid methyl ester-5-carboxylic acid amide are added to 150 ml. of water containing 15 ml. of 10 N hydrochloric acid and 20 g. of a 5% aqueous solution of the addition product of 18 to 20 mols of ethylene oxide and stearyl alcohol, the mixture is then stirred for 2 hours at room temperature, 350 ml. of ice water are added and, at 0–5°, it is diazotised by quickly pouring in 55 ml. of a 1 N sodium nitrite solution. As soon as a clear solution has been formed, the excess nitrous acid is decomposed by the addition of solid sulphamic acid, 23 ml. of 2 N sodium acetate solution and 10 ml. of xylene are then added to the solution and then, while stirring well with a high speed stirrer, a solution of 11.2 g. of 1,4-bis-(2'-hydroxy-(3')-naphthoylamido)-benzene in 38 ml. of 2 N sodium hydroxide solution, 20 ml. of ethanol and 190 ml. of water is added to the previously prepared diazonium salt solution within 10 minutes. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

In this way, 21.4 g. of a crude pigment of the above formula are obtained. The pigment is excellently suitable for pigmenting polyvinyl chloride containing plasticiser in yellowish red shades which are fast to migration.

15.0 g. of this crude pigment are added to 145 ml. of dry dimethyl aniline, the whole is stirred for 6–7 hours at a temperature of 180–190°, the finely crystalline pigment formed is filtered off at a temperature of 110–120° and the filter residue is washed with 100° hot dimethyl aniline until the washing liquor is colourless. The dimethyl aniline is then expelled from the filter cake by washing with methanol and the soft grain pigment is dried at about 100°. The strongly coloured, yellowish red pigmentings of polyvinyl chloride containing plasticiser attained with this conditioned pigment have even somewhat better properties than those obtained with the crude pigment, particularly they have very good fastness to heat, migration and light. Pure, yellowish red pigmentings of stoving lacquers produced with this conditioned pigment have very good fastness to cross-lacquering and weathering.

If, instead of the 1-aminobenzene-2-carboxylic acid methyl ester-5-carboxylic acid amide, an equimolar amount of 1-aminobenzene-2-carboxylic acid methyl ester-4-bromo- or -4-cyano-5-carboxylic acid amide is used and otherwise the procedure given in this example is followed, then disazo pigments having similar valuable properties are obtained.

EXAMPLE 47 the solution and then, while stirring strongly with a high speed stirrer, a solution of 14.2 g. of 4,4'-bis-(2''-hydroxy-(3'')-naphthoylamido)-benzanilide in 38 ml. of 2 N sodium hydroxide solution, 20 ml. of ethanol and 190 ml. of water is added to the previously prepared diazonium salt solution within 10 minutes. On completion of the addition of the coupling component, the high speed stirrer is removed and the reaction mixture is stirred with an anchor stirrer at room temperature until the coupling is complete. The disazo pigment formed is then filtered off, thoroughly washed with water, dried at 100° and pulverised.

27.9 g. of a crude pigment of the above formula are obtained in this way. The pigment is excellently suitable for the pigmenting of polyvinyl chloride containing plasticiser in red shades which are fast to migration.

The 1-aminobenzene-2-carboxylic acid morpholide-5-carboxylic acid methyl ester used in this example is obtained by partially saponifying 1-nitrobenzene-2,5-dicarboxylic acid dimorpholide with 1 equivalent of potassium hydroxide in alcohol to form 1-nitrobenzene-2-carboxylic acid morpholide-5-carboxylic acid and reacting the latter with thionyl chloride to form the corresponding acid chloride. Subsequent esterification with methanol then yields 1-nitrobenzene-2-carboxylic acid morpholide-5-carboxylic acid methyl ester which, after catalytic reduction, is converted into 1-aminobenzene-2-carboxylic acid morpholide-5-carboxylic acid methyl ester.

15.0 g. of this crude pigment are added to 145 ml. of dry dimethyl aniline, the whole is stirred for 6–7 hours at a temperature of 180–190°, the finely crystalline pigment formed is filtered off at a temperature of 110–120° and the filter cake is washed with 100° warm dimethyl aniline until the washing liquor is colourless. The dimethyl

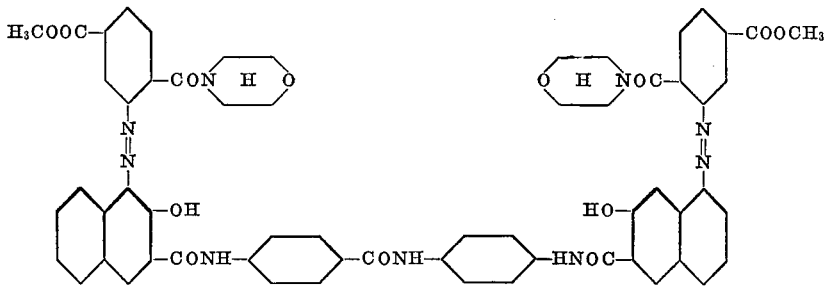

14.5 g. of 1-aminobenzene-2-carboxylic acid morpholide-5-carboxylic acid methyl ester are added to 150 ml. of water containing 15 ml. of 10 N hydrochloric acid and 20 g. of a 5% aqueous solution of the addition product of 18 to 20 mols of ethylene oxide and stearyl alcohol, the mixture is then stirred for 2 hours at room temperature, 350 ml. of ice water are then added and it is diazotised at 0–5° by quickly pouring in 55 ml. of a 1 N sodium nitrite solution. As soon as a clear solution has been attained, the excess nitrous acid is decomposed by the addition of solid sulphamic acid, 23 ml. of 2 N sodium acetate solution and 10 ml. of xylene are then added to aniline is then expelled from the filter cake by washing with methanol and the fine grain pigment is dried at about 100°. Strongly coloured, red pigmentings obtained with thus conditioned pigment on polyvinyl chloride containing plastciser have even somewhat better properties than those obtained with the crude pigment, in particular they have very good fastness to heat, migration and light. Pure red pigmentings produced with this conditioned pigment in stoving lacquers have very good fastness to cross-lacquering and weathering.

EXAMPLE 48

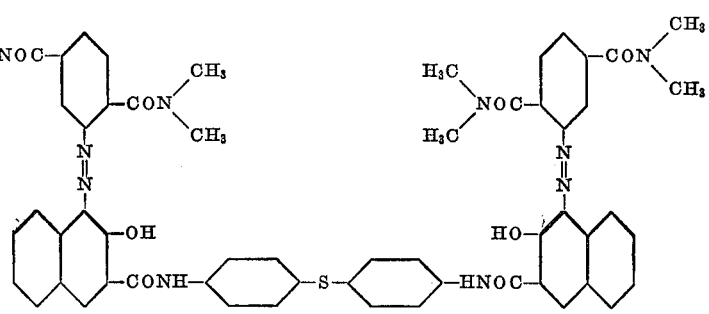

41.8 g. of the coupling product of diazotised 1-aminoterephthalic acid-bis-N,N-dimethylamide and 2-hydroxy-3-naphthoic acid are suspended in 750 ml. of dry chlorobenzene. 100 ml. of chlorobenzene are distilled off to completely dehydrate and, at 70°, 14.4 g. of thionyl chloride which has been distilled over linseed oil are added to the suspension within 5 minutes. The reaction mixture is kept boiling for 5 hours, the precipitated monoazo dyestuff carboxylic acid chloride is filtered off at boiling temperature, washed with a little dry chlorobenzene and dried in vacuo at 70°. The carboxylic acid chloride mentioned is obtained in the form of pale reddish crystals.

21.85 g. of this monoazo dyestuff carboxylic acid chloride are suspended in 500 ml. of dry toluene. At boiling temperature (108°), 5.4 g. of dry 4,4'-diaminodiphenyl thioether are added to the suspension and it is rinsed with 80 ml. of dry toluene. The condensation to form the disazo pigment begins immediately. The reaction mixture is kept at the boil for 20–24 hours until hydrogen chloride development has ceased, the pigment formed which has crystallised out is filtered off from the hot suspension, washed with warm toluene until the washing liquor is colourless and the filter residue is dried at 70° in vacuo.

A pale red pigment powder is obtained.

The 1-aminoterephthalic acid-bis-N,N-dimethylamide used in this example is obtained by condensing nitroterephthalic acid dichloride with dimethylamine and reducing the nitro compound obtained.

EXAMPLE 49

A stabilised mixture of 67 g. of polyvinyl chloride (Hostalit C 270, suspension polymer, K-value =70, Farbwerke Hoechst, Germany),
33 g. of dioctyl phthalate,
2 g. of dibutyl tin dilaurate,
0.3 g. of sodium-barium salt of an acid phosphoric acid alkyl ester, e.g. Ferroclere 541 A (Pure Chemicals Ltd., Plastics Division, England) as light stabiliser,
2 g. of titanium dioxide and
0.65 g. of disazo pigment according to paragraph 3 of Example 1, is worked up on a set of mixing rollers at 160° and then drawn out into a film of 0.4 mm. strength. The pure carmine-red colouring has very good fastness to migration, rubbing, heat and excellent light fastness.

EXAMPLE 50

A stabilised mixture of 100 g. of polyvinyl chloride (Hostalit C 260, suspension polymer, K-value=60, Farbwerke Hoechst, Germany),
1.5 g. of a barium-cadmium stabiliser (Advastab BC 26, German Advance GmbH),
0.5 g. of a co-stabiliser with organic phosphite base (Advastab CH 300, German Advance GmbH),
3.0 g. of an epoxyd soya oil (Advaplast 39, German Advance GmbH),
5.0 g. of titanium dioxide (Titandioxyd RN 56, Titangesellschaft GmbH, Leverkusen, Germany) and
0.5 g. of disazo pigment according to paragraph 3 of Example 1, is plasticised on mixing rollers at a temperature of 180° and then pressed for 5 minutes at a temperature of 200° into a sheet of about 1 mm. strength. The carmine-red colouring has excellent fastness to light.

EXAMPLE 51

A stoving lacquer consisting of 20 g. of titanium dioxide (Titandioxyd Typ RN 57, Titangesellschaft GmbH, Leverkusen, Germany),
40 g. of a 60% solution of a coconut alkyl resin (mixed polyester made of coconut oil fatty acid, phthalic acid and pentaerythritol) in xylene,
24 g. of a 50% solution of a melamine resin (Superbeckamin 852, Reichhold Chemie, Hamburg) in butanol,
8 g. of xylene,
7 g. of ethylene glycol monomethyl ether and
1 g. of disazo pigment according to paragraph 3, Example 1, is finely milled in a ball mill, sprayed onto an aluminium foil, left to dry and then stoved for 30 minutes at 120°.

The pure carmine red colouring has very good fastness to light, weathering, cross-lacquering and heat.

EXAMPLE 52

A printing ink is produced on a set of three mixing rollers from 10 g. of disazo pigment according to Example 1 (crude or conditioned pigment),
30 g. of hydrate of alumina and
60 g. of a printing varnish produced from linseed oilstand oil.

The prints obtained therewith in letterpress printing are distinguished by a beautiful carmine red shade and very good fastness to light, solvents and cross-lacquering.

EXAMPLE 53

A mixture of 25 g. of polyvinyl chloride (Vestolit B 7021, Chemische Werke Hüls, Germany),
25 g. of polyvinyl chloride (Vestolit E 8001, Chemische Werke Hüls, Germany),
32 g. of dioctyl phthalate,
1 g. of dibutyl tin dilaurate,
0.25 g. of sodium-barium salt of an acid phosphoric acid alkyl ester, e.g. Ferroclere 541 A® (Pure Chemicals Ltd., Plastic Division, England) as light stabiliser,
6 g. of Champagne chalk,
10.75 g. of Sangajol [aliphatic hydrocarbon mixture having a boiling range of 130–200° and an evaporation number of 81 (ether=1)] and
0.5 g. of disazo pigment according to Example 1 (crude or conditioned pigment), is milled in a ball mill into a paste.

Linen fabric is coated with this paste and the fabric is then heated to about 160–180°. This procedure is repeated twice.

In this way, a level carmine red coloured synthetic leather is obtained which has high grade light-fastness as well as good fastness of the pigmenting to migration and rubbing.

We claim:

1. A compound of the formula

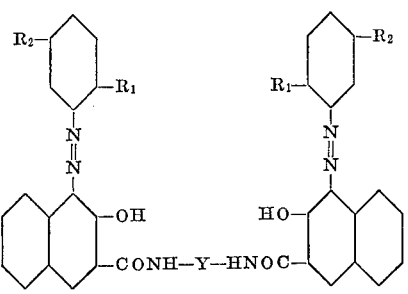

wherein each of $R_1$ and $R_2$ is a carboxylic acid alkyl ester with up to four carbon atoms and Y represents p-phenylene, lower alkyl-p-phenylene, chloro-p-phenylene or 4,4'-diphenylene.

2. A compound as defined in claim 1, wherein each of $R_1$ and $R_2$ is carboxylic acid methyl ester and Y is p-phenylene.

3. A compound as defined in claim 1, wherein each of $R_1$ and $R_2$ is carboxylic acid ethyl ester and Y is p-phenylene.

4. A compound as defined in claim 1, wherein each of $R_1$ and $R_2$ is carboxylic acid propyl ester and Y is p-phenylene.

5. A compound as defined in claim 1, wherein each of $R_1$ and $R_2$ is carboxylic acid methyl ester and Y is 2,5-dimethyl-p-phenylene.

6. A compound as defined in claim 1, wherein each of $R_1$ and $R_2$ is carboxylic acid methyl ester and Y is 4,4'-diphenylene.

References Cited
UNITED STATES PATENTS

| | | | |
|---|---|---|---|
| 2,888,453 | 5/1959 | Schmid et al. | 260—184X |
| 3,127,412 | 3/1964 | Gaertner et al. | 260—184X |
| 3,262,925 | 7/1966 | Mueller et al. | 260—184X |
| 3,459,730 | 8/1969 | Schnabel et al. | 260—184 |

FLOYD D. HIGEL, Primary Examiner

U.S. Cl. X.R.

106—23, 288; 117—138.8, 144, 154, 168; 260—37, 41, 178, 188, 202, 247.2, 465, 471, 553, 560